3,467,668
POLYAMINES COMPRISING ETHYLENE AND IMIDAZOLINYL GROUPS
Wilhelm Gruber, Darmstadt, and Peter Quis, Gross-Zimmern, Germany, assignors to Rohm & Haas G.m.b.H., Darmstadt, Germany
No Drawing. Filed Apr. 18, 1966, Ser. No. 543,063
Claims priority, application Germany, Apr. 27, 1965, R 40,467
Int. Cl. C07d 49/34
U.S. Cl. 260—309.6             4 Claims

ABSTRACT OF THE DISCLOSURE

Mixtures of oligomeric and polymeric polyamines of the formula

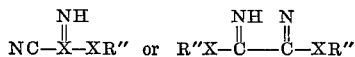

wherein R is:

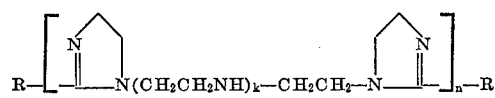

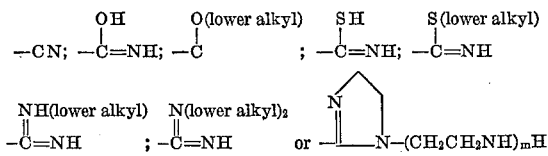

$n$ has an average value between 1 and 100; $k$ is 1 or 0; and $m$ is an integer from 1 to 3; made by reacting a polyethylene polyamine with dicyan or a dicyan derivative. The polyamines, when reacted with oil-soluble polyolefins such as polyisobutenyl succinic acid anhydride, form useful lubricating oil additives.

---

The present invention relates to oligomeric and polymeric polyamines containing imidazoline rings as a component of the main polymer chain, and to methods of making the same.

Polyamines of the type described herein, when reacted with oil-soluble polyolefins such as polyisobutenyl-succinic acid anhydride (obtained by the reaction of polyisobutylene with maleic acid anhydride) form useful lubricating oil additives with good detergent properties.

The polyamines of the invention have the formula

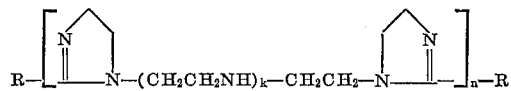

wherein R is

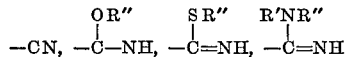

or

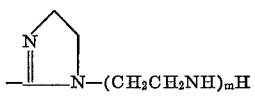

In the formulas, R′ is alkyl, aryl, or aralkyl, R″ is hydrogen, alkyl, aryl, or aralkyl, $n$ has an average value between 1 and 100, $k=0$ or 1, and $m$ is an integer from 1 to 3. Compounds of this type are obtained by the reaction of an alkylene polyamine such as diethylene triamine, triethylene tetramine, or tetraethylene pentamine, with dicyan or its derivatives in a lower alkanol or a mixture of a lower alkanol with water. In particular, the amines are reacted with dicyan or dicyan derivatives of the formula $$NC-X-XR'' \quad \text{or} \quad R''X-\underset{\underset{NH}{\|}}{C}-\underset{\underset{N}{\|}}{C}-XR''$$

wherein X=NR′, O, or S, and R′ and R″ have their earlier meanings. When diethylene triamine is reacted, for example, polyamines are obtained in which $k=1$ and $m=1$. When triethylene tetramine is reacted, products are obtained in which $k=0$ and $m=2$. When tetraethylene pentamine is reacted, products are obtained in which $k=1$ and $m=3$.

The degree of oligomerization or polymerization of the compounds produced according to the invention (i.e. the value of $n$ in the formula) increases with the time and temperature of reaction. Reaction temperatures between about 0° and about 100° C. are conveniently employed. Lower molecular weight products obtained by the reaction can be further condensed by heating at temperatures above about 100° C. (but below decomposition temperatures), suitably under reduced pressure. The heating may optionally take place in the presence of a catalyst such as finely-divided nickel (Raney nickel) or zinc chloride.

Of the end groups R which are possible in the products, the predominant end group depends on the nature and relative amounts of the reactants employed. For example, an excess of dicyan leads to a product primarily containing cyan end groups. Correspondingly, dicyan derivatives which have amidoester, amidothiolester, or amidine groups give products having these groups as end groups when the named derivatives are, respectively, employed in excess. On the other hand, if a polyethylene polyamine is present in excess in the reaction mixture, then the predominant end group in the reaction product is

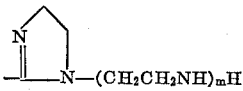

where the value of $m$ depends on the choice of the polyethylene polyamine reacted.

The reaction of diethylene triamine with dicyan in ether has been described by H. M. Woodburn and J. R. Fisher in the Journal of Organic Chemistry, 22, 895 (1957). A compound of the formula

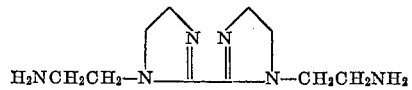

is obtained. The amine, which is an almost colorless fluid boiling at 95° C./6 mm. Hg, is isolated small yield, i.e. about 12 percent.

In the reactions of the present invention, which take place in lower alkanols or aqueous lower alkanols, the solvent is suitably removed after the reaction, for example by distillation. Any by-products present, for example the compound described by Woodburn and Fisher, are also suitably removed, for example by extraction with ether, to purify the product. The end product purified in this manner can be thermally treated, optionally after addition of a catalyst such as 0.05% by weight of zinc chloride, to produce a higher molecular weight product by condensation.

A better understanding of the invention and of its many advantages will be had by referring to the following specific examples given by way of illustration.

Example 1

50 g. of diethylene triamine were added to a slurry of 24 g. of dithiooxamide (rubeanic acid) in 50 g. of ethyl alcohol at 20° C. The mixture was heated with stirring to 40°–50° C., whereupon the reaction proceeded with evolution of NH₃ and H₂S at a temperature of 65° C. maintained by exothermic heating. After all of the dithiooxamide was dissolved and the principal evolution of gas was over, the mixture was heated under reflux at the boiling point of the alcohol for a further two hours. Thereafter, the alcohol and excess amine were distilled off.

39.6 g. of a syrupy brown oil were obtained.

*Analysis.*—C=54.5%; H=8.0%; N=35.6%. Theoretical values: (*n*=2) C=55.7%; H=8.58%; N=35.8%; (*n*=100) C=58.0%; H=8.21%; N=33.9%.

Example 2

30 g. of dicyan were introduced into a solution of 103 g. diethylene triamine in 300 g. of ethyl alcohol at 50° C. The reaction mixture turned red-brown. The mixture was heated for about one hour at the boiling point of the alcohol, and the alcohol was then removed by distillation. The residue was a brown syrupy oil. On heating to 140° C. at 5 mm. Hg, no distillate was obtained. 99.5 g. of a viscous brown oil having a N-content of 33.9% were obtained. The average molecular weight of the product was 970.

Examples 3–7

In each case, 0.1 mol of the dicyan derivative indicated in following Table I was dissolved in 200 grams of ethanol. 0.2 mol of diethylene triamine in admixture with an equal volume of ethanol was quickly added dropwise at room temperature. The mixture was stirred for a half hour at room temperature. The dark ethanolic solution was then freed of solvent in vacuum, and the dark oily residue obtained was kept at 70° C. for eight hours in a vacuum drying cabinet.

TABLE I

| Ex. No. | Dicyan Derivative (Grams) | Yield (Grams) | Percent N Found |
|---|---|---|---|
| 3 | Cyanformic acidimidoethyl-ester (9.8). | Brown resinous oil (21.5). | 35.0 |
| 4 | Oxaldiimide aciddiethylester (14.4). | Brown resinous oil (18.0). | 33.2 |
| 5 | Cyanformimide acid-ethyl thiol ester (11.4). | Brown resinous oil (20.0). | 34.0 |
| 6 | Oxaldiimide acid-diethyl thiol ester (14.8). | Brown resinous oil (22.0). | 33.2 |
| 7 | Cyanformic acid-diethyl-amidine (20.6). | Brown resinous oil (20.0). | 32.3 |

The infrared spectra of all the substances obtained show the same bands.

Example 8

42 g. (0.288 mol) of triethylene tetramine were dissolved in 200 g. of ethanol. 15 g. dicyan (0.289 mol) were introduced at room temperature. The mixture was heated for 1½ hours at 50° C. and then for 16 hours at 78° C. After removal of the ethanol by distillation, 46 g. of a dark brown material, which is a solid resin at room temperature, remained.

*Analysis.*—N=34.1%.

This value corresponds with that calculated for a product of the formula given earlier herein in which *k*=0 and *n* is such a high number that the end groups R can be neglected in calculating the molecular weight.

Example 9

189 g. (1 mol) of tetraethylene pentamine were dissolved in 600 g. of ethanol. 52 g. (1 mol) of dicyan were introduced into the solution at room temperature. The mixture was heated for one hour at 78° C. and the ethanol was then slowly removed at normal pressures by distillation. After maintaining the material for several hours in a drying cabinet at 100° C., 205 g. of a dark brown resinous oil were obtained.

*Analysis.*—N=33.5%.

The average molecular weight of the product was 1230.

Example 10

297.5 g. (2.88 mols) of diethylene triamine were dissolved in a mixture of 375 g. of methanol and 375 g. of water. 75 g. (1.44 mols) of dicyan were introduced at a temperature of —20° C. with stirring. The reaction solution remained colorless. After the introduction of dicyan had been completed, the mixture was stirred further for one hour at 30° C. Finally, the solvent was slowly removed in vacuum at a bath temperature of 50°–60° C. 309 g. of a bright yellow oil having an average molecular weight of 540 were obtained.

*Analysis.*—N=35%.

In this, and the other examples herein, mixtures of substances of different degrees of condensation are obtained as reaction products, as is to be expected in a polycondensation reaction. This was demonstrated by thin layer chromatographic analysis of the products of Examples 2 and 10 herein.

The products of Examples 2 and 10 and bis-Δ²-imidazolinyl-2, carried in a 4:1 mixture of ethanol and 25% aqueous ammonia, were chromatographically separated in an upward direction on a silica gel plate having a thickness of 250 micron. After 60 minutes, the solvent front was ten centimeters above the starting line. At this time, the plate was taken from the solution, dried, and developed with ninhydrin. The bis-Δ²-imidazolinyl-2 gave a single trace at an Rf value of 0.77. The chromatograms of the products prepared according to Examples 2 and 10 were practically the same and comprised three traces with Rf-values of 0.50, 0.20 and 0.045, as well as a heavy trace at the starting point extending in the flow direction.

The chromatograms showed that the products of Examples 2 and 10 comprise at least 4 components, each of molecular weights greater than the bis-imidazolinyl compound. The trace produced by the experimental products in the proximity of the starting line very probably represents a number of higher condensation products.

Imidazoline groups are recognizable in the infrared spectra of the materials of all the examples herein.

Example 11

26 g. (0.5 mol) of dicyan were introduced into a mixture of 200 g. of methanol, 200 g. of water, and 146 g. (1 mol) of triethylene tetramine at —20° C. The mixture was then permitted to warm to room temperature with stirring. After standing for several days at 25° C., the solvent was slowly removed in vacuum at 60° C. 150 g. of a bright yellow crystal-containing oil were produced.

*Analysis.*—N=34.0%.

We claim:

1. Mixtures of oligomeric and polymeric polyamines of the formula

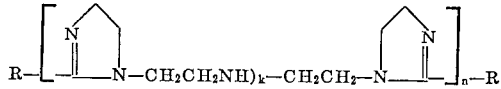

wherein R is:

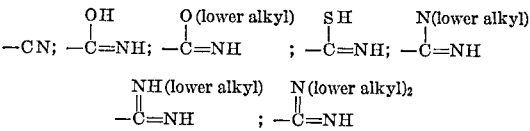

or

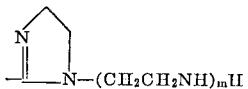

*n* has an average value between 1 and 100; *k* is 0 or 1; and *m* is an integer from 1 to 3; prepared by reacting about one to two molar parts of diethylene triamine, triethylene tetramine, or tetraethylene pentamine with one molar part of dicyan or of a dicyan derivative of the formula:

(A) 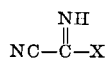

wherein X is —OH, —SH, —O (lower alkyl), or —N (lower alkyl)₂; or of the formula (B) 

wherein both X's are the same and are —OH, —SH, —O (lower alkyl), —S (lower alkyl), —NH (lower alkyl), or —N (lower alkyl)₂; in a lower alkanol or an aqueous lower alkanol at a temperature from about 0° C. to about 100° C.

2. Mixtures as in claim 1 produced by the reaction of dicyan.

3. Mixtures as in claim 1 produced by the reaction of a dicyan derivative.

4. Mixtures as in claim 1 produced by the reaction of diethylene triamine with dithiooxamide.

References Cited

UNITED STATES PATENTS

| | | | |
|---|---|---|---|
| 1,958,529 | 5/1934 | Bockmühl et al. | 260—309.6 |
| 1,999,989 | 4/1935 | Bockmühl et al. | 260—309.6 |
| 2,461,156 | 2/1949 | Hartmann et al. | 260—309.6 |
| 2,899,426 | 8/1959 | Bloom | 260—309.6 |
| 2,919,274 | 12/1959 | Faust et al. | 260—309.6 |
| 3,147,270 | 9/1964 | Anderson | 260—309.6 |
| 3,147,275 | 9/1964 | Fruhstorfer et al. | 260—309.6 |
| 3,161,653 | 12/1964 | Fruhstorfer et al. | 260—309.6 |

OTHER REFERENCES

Woodburn et al., Jour. Org. Chem., vol. 22, pp. 895–9 (1957).

HENRY R. JILES, Primary Examiner

NATALIE TROUSOF, Assistant Examiner

U.S. Cl. X.R.

252—47.5, 51.5; 260—2, 78.4, 79, 453, 465, 465.5, 564, 565, 566